US006968090B2

(12) United States Patent
Yokose

(10) Patent No.: US 6,968,090 B2
(45) Date of Patent: Nov. 22, 2005

(54) IMAGE CODING APPARATUS AND METHOD

(75) Inventor: Taro Yokose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 694 days.

(21) Appl. No.: 09/948,763

(22) Filed: Sep. 10, 2001

(65) Prior Publication Data

US 2002/0097918 A1 Jul. 25, 2002

(30) Foreign Application Priority Data

Dec. 22, 2000 (JP) .......................... P.2000-390124

(51) Int. Cl.[7] ................................................ G06K 9/36
(52) U.S. Cl. ...................................................... 358/251
(58) Field of Search ......... 382/232–253; 375/240–241

(56) References Cited

U.S. PATENT DOCUMENTS 5,488,483 A * 1/1996 Murayama .................. 382/251
5,631,977 A * 5/1997 Koshi et al. ................ 382/239
5,677,689 A * 10/1997 Yovanof et al. .............. 341/50
5,764,296 A * 6/1998 Shin ...................... 375/240.18
5,767,986 A * 6/1998 Kondo et al. .......... 358/426.14
5,805,222 A * 9/1998 Nakagawa et al. .... 375/240.12
6,023,531 A * 2/2000 Peters ........................ 382/232
6,195,462 B1 * 2/2001 Bryniarski et al. ......... 382/239
6,272,259 B1 * 8/2001 Mizoguchi .................. 382/251
6,330,369 B1 * 12/2001 Cornog et al. .............. 382/251
6,339,657 B1 * 1/2002 Yamaguchi et al. ........ 382/239
6,597,815 B1 * 7/2003 Satoh et al. ................ 382/251

FOREIGN PATENT DOCUMENTS

JP 5-260308 10/1993

OTHER PUBLICATIONS

Endo, "International Standard Coding System of Color Still Image", Interface, Dec. 1991, pp. 160-167.

* cited by examiner

*Primary Examiner*—Jingge Wu
(74) *Attorney, Agent, or Firm*—Morgan, Lewis & Bockius LLP

(57) ABSTRACT

The image input from the image inputting portion 10 are DCT-converted by the DCT portion 20, then the converted result is quantized by the quantizing portion 40, then the quantized result is entropy-coded by the entropy coding portion 50, and then the coded output is output. The quantization table calculating portion 30 holds respective reference quantizing steps for the reference resolution, then receives the resolution data of the input image, then calculates respective quantizing steps based on (quantizing step) =(reference quantizing step)/(reference resolution)×(resolution of the input image) so as to fit to the input image, and then prepares the quantization table.

13 Claims, 6 Drawing Sheets

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

| CORRECTED VALUE | CORRECTED QUANTIZATION STEP |
|---|---|
| IMAGE QUALITY 1 | Q1 |
| IMAGE QUALITY 2 | Q2 |
| IMAGE QUALITY 3 | Q3 |

IMAGE CODING APPARATUS AND METHOD

BACKGROUND OF THE INVENTION

1. Field of the Invention

The present invention relates to the compression technology for image data and, more particularly, the lossy compressed coding for multi-level input image.

2. Description of the Related Art

Since normally image data have an enormous amount of data, in case of communication, store, and the like, the image data is compressed to reduce an amount of data. Coding approach of the image data is roughly classified into two types of a lossless coding system and a lossy coding system.

As for the latter, for example, abase line system defined by Joint Photographic Experts Group (referred simply to as JPEG hereinafter) is a typical compression system (For example, Endo; "International Standard Coding System of Color Still Image" Interface, December 1991, pp.160–167). Normally the lossy compression can control tradeoff between image quality and an amount of codes by coding parameters. In JPEG, a quantization table corresponds to the coding parameters.

The quantization table defines 8×8 quantizing steps in quantizing process executed in JPEG. If the quantization table is kept constant, the image quality and the amount of codes can be obtained at the same level when the images having similar characteristics are input. This is because the quantization is applied to a frequency component, i.e., a DCT (Discrete Cosine Transform) component. Thus, the similar quantized results can be derived from the image whose frequency component has the similar tendency.

However, it is normally known that, if the image which has the same contents but has different resolution are input, the image quality is largely different. More particularly, if the resolution is lower, the degradation of the image quality is more conspicuous in many cases. As a related art that intends to overcome such problem, an approach disclosed in Patent Application Publication (KOKAI) Hei 5-260308 will be explained as an example in the related art. This example in the related art is such a technology that relationships among the image quality, the resolution, and the quantization table are derived previously by the sensory evaluation and then the optimum quantization table is selected in compliance with the result and input conditions.

FIG. 11 is an example of a configuration of an image coding apparatus in the related art. The configuration and the terms are partially modified in line with purpose of the explanation of the present invention, but such modifications do not affect the essence of the invention. In FIG. 11, 10 is an image inputting portion, 20 is a DCT portion, 31 is a quantization feature storing portion, 32 is a quantization table setting portion, 40 is a quantizing portion, 50 is an entropy coding portion, 60 is a code outputting portion, 100 is image data, 110 is resolution data, 111 is quantization table designating data, 120 is DCT component data, 130 is quantized table data, 140 is quantized DCT component data, and 150 is coded data.

Each of portions of the image coding apparatus in FIG. 11 will be explained. The image inputting portion 10 receives the input data from the external device, and then sends out the data to the DCT portion 20 as the image data 100 and sends out the resolution to the quantization feature storing portion 31 as the resolution data 110. The DCT portion 20 applies DCT (Discrete Cosine Transform) to the image data 100, and then sends out the DCT component data 120 to the quantizing portion 40. The quantization feature storing portion 31 generates the quantization table designating data 111 based on stored information and the input resolution, and then sends out the quantization table designating data 111 to the quantization table setting portion 32. The quantization table setting portion 32 sends the quantized table data 130 to the quantizing portion 40 based on the quantization table designating data 111. The quantizing portion 40 applies the quantization process to the DCT component data 120 based on the quantized table data 130, and then sends out the quantized DCT component data 140 to the entropy coding portion 50. The entropy coding portion 50 executes entropy coding of the quantized DCT component data 140 by a predetermined method, and then sends out the coded data 150 to the code outputting portion 60. The code outputting portion 60 sends out the coded data 150 to the external device.

An operation of the example in the related art based on the above configuration will be explained. FIG. 12 is a flowchart showing an operation of the image coding apparatus in the related art. The operation of the example in the related art will be explained with reference to FIG. 12.

In S10, the image data are input into the image inputting portion 10. In 520, the DCT is executed in the DCT portion 20. In S31, desired subjective evaluation value and the resolution of the input image are searched from the stored information to obtain the corresponding quantization table. In S32, the quantization table searched in the quantization table setting portion 32 is supplied to the quantizing portion 40. In S40, the quantizing portion 40 executes the quantization by using the quantization table in S32. In S50, the entropy coding portion 50 applies the entropy coding to the quantized result in S40. In S60, the code outputting portion 60 sends out the coded data to the external. In S70, the coding process is finished if the image data are ended, otherwise the process goes to S10.

In the above operation, the order of S20, S31 and S32 may be set oppositely, otherwise they may be executed in parallel. Also, the quantization feature storing portion 31 stores the relationships among the objective evaluation value, the resolution, and the quantization table as information, and such information are obtained by the sensory evaluations that are carried out in advance. Also, as the entropy coding executed in S50, the Huffman coding and arithmetic coding are designated in JPEG. Since other details are well known in the above literature, etc., their explanations are omitted.

Then, problems in the example in the related art will be explained. In the example in the related art, relationship between the image quality and the resolution (referred to as "quantization feature" hereinafter) is obtained by the sensory evaluations. At first, problems of the sensory evaluations themselves will be explained. First, since normally a large number of images must be employed in the sensory evaluation by assigning a number of parameters, a great deal of time and labor are needed. Specifically, the parameters in the related art are the image type, the resolution, and the quantization table. Second, since evaluated results are varied by the evaluators, many evaluators must be prepared. Third, if subjectivity of the evaluator is different from subjectivity of the actual user of the system, it is impossible to get proper evaluation of the image quality from the user's point of view.

Next, problems in the configuration in the related art will be explained. First, the mechanism for holding the quantization feature, i.e., the quantization feature storing portion 31 is essential in the related art. Second, even if the input image are different from the supposed type, the quantization feature cannot be switched in this configuration. Where the type indicates tendency on the above frequency component. For example, in the document, the photograph, CG, etc., contained frequency components are different, respectively. Third, if fine adjustment is required for the unexpected input, e.g., incomplete resolution and incomplete image quality, it is impossible to deal with since the corresponding quantization features are not stored.

As described above, as the problems in the related art, an implementation cost, instability of the evaluation, and the non-universality, that are inhere in the sensory evaluation itself, are listed since the results of the sensory evaluations are utilized. Also, as the problems based on the configuration, cost of the additional configuration, inadequacy to the image type, and inadaptability to the variation in the parameters may be listed.

SUMMARY OF THE INVENTION

The present invention has been made in view of above circumstances and it is an object of the present invention to provide a lossy coding apparatus that is capable of suppressing variation in the image quality due to the resolution.

According to a first aspect of the invention, there is provided an image coding apparatus adapted to realize image quality of a decoded image constant independently of resolution of the image, the image coding apparatus comprising:

an image inputting section adapted to input an image;

a frequency converting section adapted to apply frequency conversion to the image to output a first frequency component of the image, the first frequency component defined by a resolution of the image;

a quantization parameter calculating section adapted to calculate a quantization parameter;

a quantizing section adapted to apply quantization to the first frequency component by using the quantization parameters;

a coding section adapted to code an output of the quantizing section; and a code outputting section adapted to output an output of the coding section as a code, wherein a second frequency component of the image is defined by a reference resolution; and the quantization parameter calculating section calculates the quantization parameter applying a predetermined quantization to the first frequency component of the image in accordance with the second frequency of the image.

In this configuration, the same quantizing steps can be calculated simply for the same frequency component defined by the reference resolution with respect to the input image having any resolution, and thus an equal decoded image quality can be obtained.

One resolution or two resolutions or more may be used as the reference resolution. If a plurality of reference resolutions are used, the quantizing steps calculated from reference resolutions, respectively, maybe synthesized or the best quantizing step may be selected, for example.

Also, according to a second aspect of the invention, there is provided the image coding apparatus according to the first aspect of the invention, the frequency conversion executed by the frequency converting section is DCT; the coding executed by the coding section is one of a Huffman coding and an arithmetic coding; and the code outputted from the code outputting section is based on a JPEG system.

According to a third aspect of the invention, there is provided the image coding apparatus according any one of the first and second aspects of the invention, wherein the quantization parameter calculating section calculates the quantization parameter in accordance with a function having a reference quantization parameter, the reference resolution, and the resolution of the image inputted from the image inputting section as arguments.

According to a fourth aspect of the invention, there is provided the image coding apparatus according to any one of first to third aspects of the invention, the quantization parameter calculating section calculates the quantization parameter in accordance with an equation of (a reference quantization parameter)÷(the reference resolution)×(the resolution of the image inputted from the image inputting section).

According to a fifth aspect of the invention, there is provided the image coding apparatus according to any one of the first to fourth aspects of the invention, wherein the quantization parameter calculating section extracts a corresponding first frequency component from an interpolated reference quantization parameter.

According to a sixth aspect of the invention, there is provided the image coding apparatus according to any one of the first to fifth aspects of the invention, wherein the quantization parameter calculating section multiplies a reference quantization parameter by a constant to calculate the quantization parameter; and the constant is determined to minimize one of a sum of square differences between the reference quantization parameter and the quantization parameter, a sum of absolute values of the differences between the reference quantization parameter and the quantization parameter, and a maximum of the differences between the reference quantization parameter and the quantization parameter.

According to a seventh aspect of the invention, there is provided the image coding apparatus according to any one of the first to fifth aspects of the invention, wherein the quantization parameter calculating section multiplies a reference quantization parameter by a constant to calculate the quantization parameter; and the constant is determined so that the quatization parameter is lower than the reference quantization parameter.

According to a eighth aspect of the invention, there is provided the image coding apparatus according to the sixth aspect of the invention, wherein the quantization parameter calculating section calculates the quantization parameter to minimize the one at a limited range of the second frequency components.

According to a ninth aspect of the invention, there is provided the image coding apparatus according to any one of the first to eighth aspects of the invention, wherein wherein a corrected value is obtained by sensory evaluation; and when a resolution of the image inputted from the image input section is lower than the reference resolution, the quantization parameter calculating section compensates the quantization parametere by using the corrected value with taking into consideration a noise scattering range.

According to a tenth aspect of the invention, there is provided the image coding apparatus according to any one of the first to ninth aspects of the invention, further comprising an image quality adjusting section adapted to input a corrected value of the image quality, wherein the calculation in the quantization parameter calculating section is performed based on the corrected value.

According to a eleventh aspect of the invention, there is provide the image coding apparatus according to any one of the first to tenth aspects of the invention, wherein the quantization parameter calculating section calculates a corrected quantization parameter according to a function of a reference quantization parameter and the corrected value, and calculates the quantization parameter according to another function having the corrected quantization parameter, the reference resolution, and a resolution of the image as arguments.

According to a twelfth aspect of the invention, there is provided an image coding apparatus comprising:

an image inputting section adapted to input an image;

a frequency converting section adapted to apply frequency conversion to the image to output a frequency component of the image;

a quantization parameter calculating section adapted to calculate a quantization parameter;

a quantizing section adapted to apply quantization to the frequency component of the image by using the quantization parameters;

a coding section adapted to code an output of the quantizing section; and a code outputting section adapted to output an output of the coding section as a code;

wherein the quantization parameter calculating section calculates a plurality of quantization steps constituting the quantization parameter on a basis of a plurality of quantizing steps set for a reference resolution and a resolution of the image.

According to a thirteenth aspect of the invention, there is provided an image coding method comprising the steps of:

inputting an image;

applying a frequency conversion to the image to output a first frequency component of the image, the first frequency component defined by a resolution of the image;

calculating a quantization parameter;

quantizing the first frequency component by using the quantization parameter; and coding the quantized first frequency component, wherein the quantization parameter calculating step calculates the quantization parameter applying a predetermined quantization to the first frequency component of the image in accordance with the second frequency of the image.

According to a fourteenth aspect of the invention, there is provided the image coding method according to the thirteenth aspect of the invention, the method further comprising the steps of correcting the quantization parameter in response to designation from an outside.

According to a fifteenth aspect of the invention, there is provided a recording medium for recording computer-readably an image coding computer program executed in a computer, the program comprising the steps of:

inputting an image;

converting the image into a frequency component defined by a reference resolution;

calculating a quantization parameter;

quantizing the frequency component by using the quantization parameters;

coding the quantized requency component; and outputting a result of the step of coding as a code; wherein a second frequency component of the image is defined by a reference resolution; and the quantization parameter is calculated so that when a plurality of second frequency components of different images are equal, a plurality of first frequency components corresponding to the plurality of the second frequency components, respectively, are equally quantized.

According to a sixteenth aspect of the invention, there is provided a recording medium for recording computer-readably an image coding computer program executed in a computer, the program comprising the steps of:

inputting an image;

calculating each of a plurality of quantizing steps based on each of a plurality of reference quantization steps, which are set for a reference resolution, and a resolution of the image;

converting the image into a frequency component;

quantizing the frequency component by using the quantization parameters; and coding a result of the quantization.

According to a seventeenth aspect of the invention, there is provided a recording medium for recording computer-readably an image coding computer program executed in a computer, the program comprising the steps of:

inputting an image;

converting the image into a frequency component;

calculating a quantization parameter in response to a resolution of the image;

quantizing the frequency component by using the quantization parameter; and coding a result of the quantization. Incidentally, it is a matter of course that at least a part of the invention can be implemented as a computer program.

Also, the above features of the invention will be ginven in detail hereinafter.

DETAILED DESCRIPTION OF THE PREFERRED EMBODIMENTS

The present invention will be explained in detail with reference to embodiments of the present invention hereinafter.

[Basic Principle]

Prior to particular explanation of the embodiments according to the invention, a basic principle of the invention will be explained. First, it will be explained why variation in image quality would be brought about by resolution in compression using the same quantization parameter.

First, the image quality referred to hereunder is defined. Generally, the image quality in the compression signifies a difference between an original image and a decoded image. Here, since a plurality of original images each having the different resolution are present, the image quality is considered as each of differences between the original image in each of resolutions and the decoded image in each of resolutions. As a result, the fact that the picture qualities of the decoded images each having the different resolution are the same signifies that the differences between the original image and the decoded images are almost the same in respective resolutions.

Figures 3, 4:
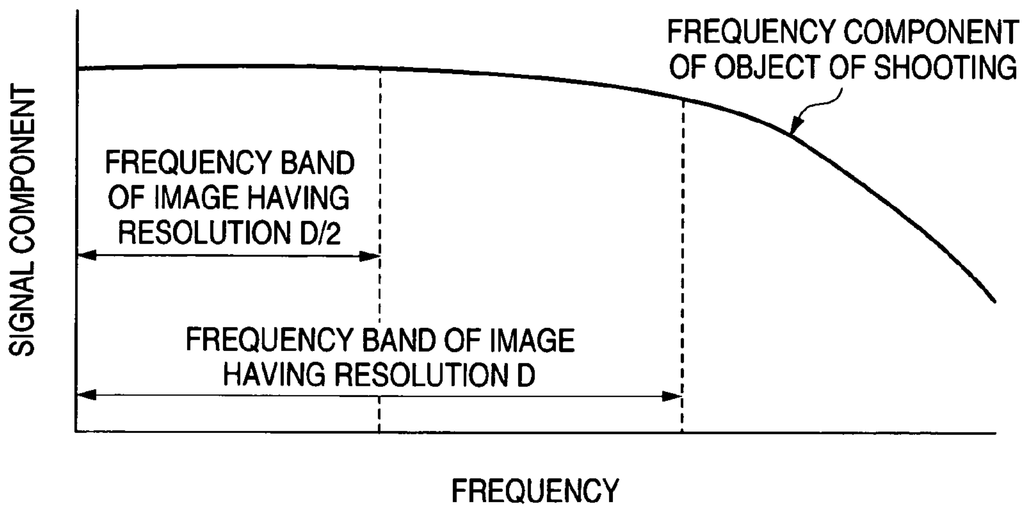
FIG. 3 is a view showing a relationship between an image and a frequency band of an object of shooting.
FIG. 4 is a view showing a recommended quantization table of JPEG.

The images that are input into the coding apparatus are constructed by discrete pixels. However, there is no concept of the pixel in the material as the objective, e.g., the object of shooting in photograph. Accordingly, if any reference wavelength is decided, theoretically the object of shooting contains infinite frequency components whereas the image can merely represent up to the finite frequency component. The frequency range, which the image can contain, is called a frequency band hereinafter. FIG. 3 is an explanatory view thereof.

An image having resolution D/2 can have merely a half frequency band of an image having resolution D. This is because the maximum expressible frequency is limited by the resolution, and this phenomenon is generally known as the sampling theorem.

The quantization in the frequency conversion coding including JPEG will be explained. Purpose of the frequency conversion is to achieve higher image quality quantization by the same amount of codes by quantizing high frequency component, that is visually inconspicuous, more roughly than low frequency component. Accordingly, quantization parameters in JPEG and others are set in many cases such that, as the frequency becomes higher, the rougher quantization is applied to the data. FIG. 4 is an example of a recommended quantization table of JPEG.

Figure 5:
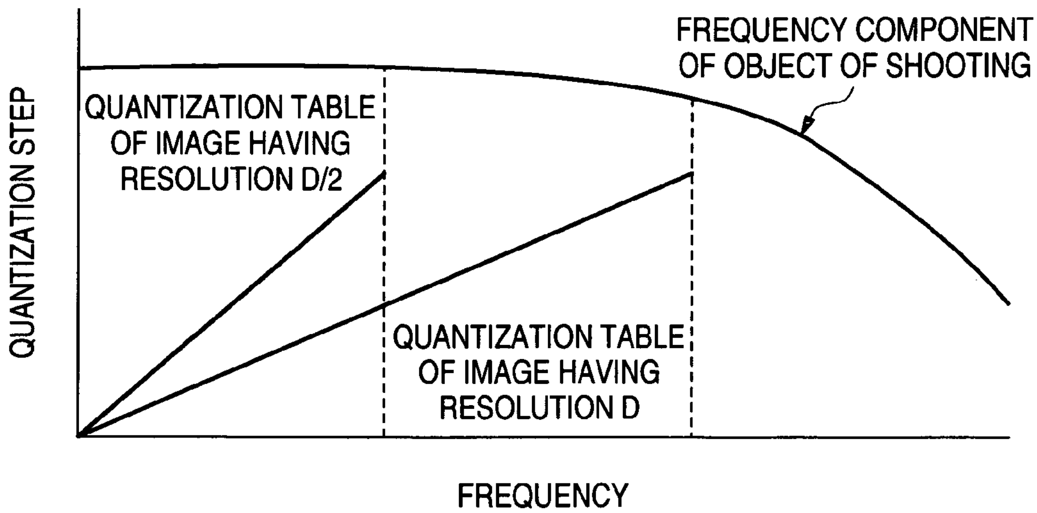
FIG. 5 is a view showing a relationship between frequency and a quantization table.

Since preparation is ready with the above, there will be explained the problem that, although the same quantization table is employed, the image quality is degraded when the resolution becomes rough. For example, the quantization table in which the quantization is set rougher linearly from the low frequency to the high frequency will be discussed. The normal frequency conversion is discrete. However, for simplicity, if the quantization can be carried out continuously on the frequency, relationships between the quantizing step and the frequency are linear graphs. FIG. 5 is a conceptional view of such graphs.

The image having the resolution D/2 can have merely the half frequency band of the image having the resolution D. If the same quantization table as that for the image having the resolution D is applied to this half frequency band, an increasing rate of the quantizing step with respect to the frequency becomes twice apparently. This corresponds to the event that the quantization that is two times rough is applied to the particular frequency component of the object of shooting. That is, if the images that have the same contents but have different resolutions, respectively, are to be coded, an employment of the same quantization table is equivalent to that in fact N-times quantization is applied to the image having the 1/N resolution. This is the major cause to lower the image quality.

The actual quantization table in the frequency conversion coding is not linear with respect to the frequency component, and also the normal discrete frequency conversion contains omission of calculation and an error in contrast to the ideal frequency conversion. Therefore, the above theory cannot be strictly applied as it is. However, even if such difference is taken account of, this theory can be applied roughly.

According to the above described theory, the invention defines the quantization table so that almost the same quantizing step is provided to the particular frequency component irrespective of the resolution, thereby enabling to accomplish the decoded image having the image quality irrespective of the resolution. The specific method will be explained in embodiments. Three examples, i.e., (1) an example in which the invention is applied to JPEG, (2) a more normal example, and (3) an example in which the image quality is finely adjusted will be described as embodiments of the invention.

[First Embodiment]

Figure 1:
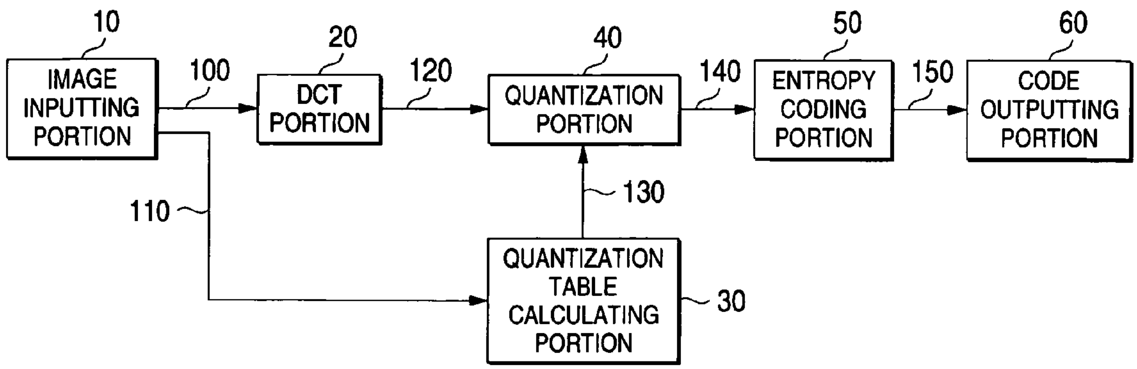
FIG. 1 is a view showing a configuration of an image coding apparatus according to a first embodiment of the invention.
Figure 11:
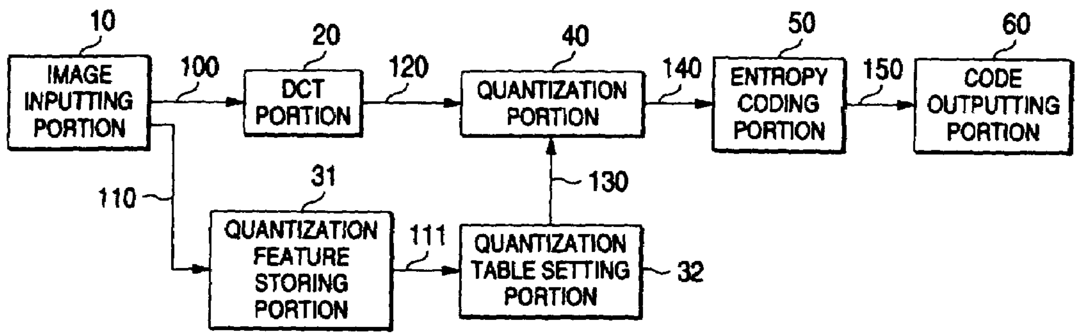
FIG. 11 is a view showing a configuration of an image coding apparatus according to the related art.
Figure 12:
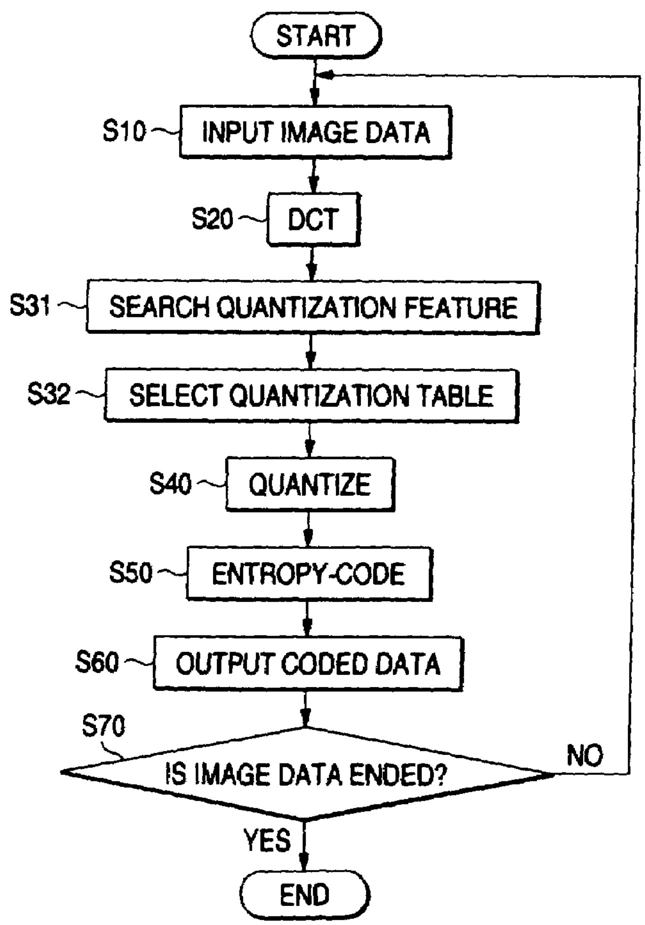
FIG. 12 is a flowchart showing an example of an operation of the image coding apparatus according to the related art.

As a first embodiment of the invention, the example in which the invention is applied to JPEG will be explained. FIG. 1 is a block diagram showing the image coding apparatus according to the first embodiment. In FIG. 1, the same symbols are assigned to portions similar to those in FIG. 11, and their explanation will be omitted. Numeral 30 denotes a quantization table calculating portion.

Each of portions in FIG. 1 will be explained. The quantization table calculating portion 30 calculates the quantization table by a predetermined method based on the resolution data 110, and then supplies the calculated data to the quantizing portion 40 as the quantization table data 130.

Figure 2:
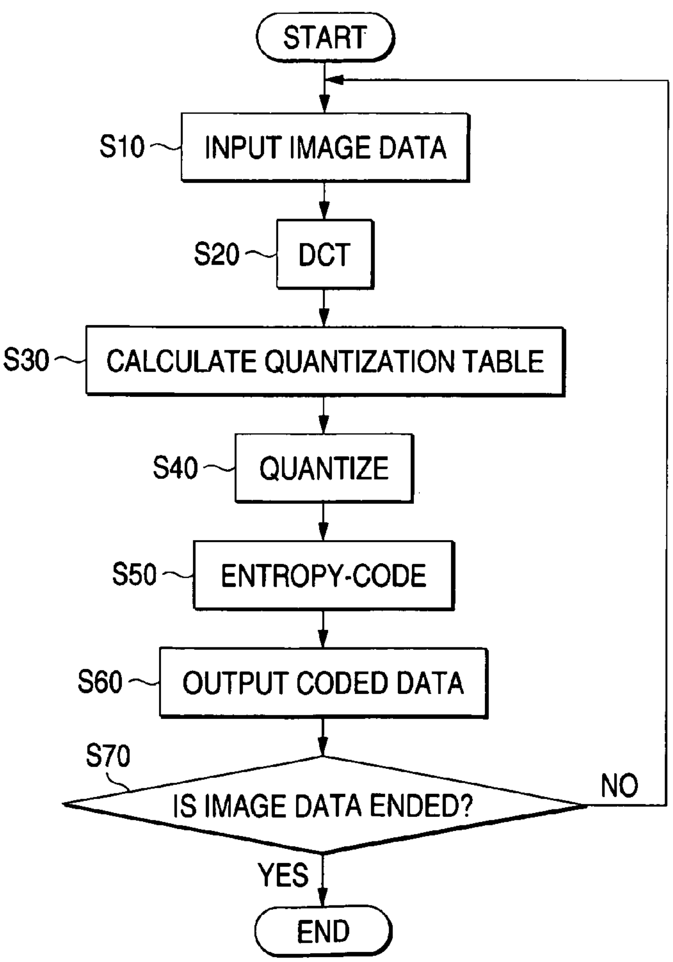
FIG. 2 is a flowchart showing an example of an operation in the image coding apparatus according to the first embodiment of the present invention.

An operation of the first embodiment will be explained based on the above configuration. FIG. 2 is a flowchart showing a coding operation of the first embodiment. In FIG. 2, the same symbols are assigned to portions similar to those in FIG. 11, and their explanation will be omitted. In this embodiment, as shown in FIG. 2, in step S30, the quantization table is calculated by the quantization table calculating portion 30.

In the above operation, the order of S20 and S30 may be reversed, or they may be carried out in parallel.

The calculation of the quantization table in S30 will be explained. One-dimensional DCT will be explained for simplicity of the description, the totally same explanation may be applied to two-dimensional DCT employed in JPEG. First, symbols used in the following explanation are defined. The frequency is denoted by F, and the quantization table is denoted by Q. In addition, the quantizing step as a factor of Q is denoted by $Q_F$ using the frequency F as a suffix. The resolutions defined respectively are indicated together in ( ). For example, the frequency defined by the resolution R is F(R). If the resolution is not defined yet, i.e., in the case of the object of the image picking-up, the resolution is denoted by ∞. An abscissa of FIG. 3 and FIG. 5 is F(∞) in compliance with this notation.

The frequency in the certain image normally regards one pixel as a unit of the wavelength. Accordingly, as apparent from FIG. 3 and FIG. 5, a following relationship can be derived.

$$F(R)=F(R/N)/N \tag{1}$$

Assume that Q, Q' are used in the imaged having different resolutions R, R/N, respectively, if "to employ the same quantizing step in respective tables" is denoted by an equation, the following will be given.

$$Q_{F(R)}=Q'_{F(R/N)} \tag{2}$$

Where, by substituting Eq. (1) into Eq. (2), the following will be given.

$$Q_{F(R)}=Q'_{F(R)\times N} \tag{3}$$

Eq. (3) represents the reason for the deterioration in the image quality due to the reduction of the resolution, that is explained prior to the present embodiment. That is, this indicates that the quantizing step used at the frequency F(R) having the certain resolution R is used at the frequency F(R)×N in the quantization table Q' having another resolution.

Meanwhile, it is the purpose of the calculation of the quantization table in the present embodiment to provide the constant quantizing step that is independent on the resolution to the particular frequency component of the object of shooting. This is expressed by Eq. (4) as follows.

$$Q_{F(R)}=Q'_{F(R)} \tag{4}$$

Where the suffix R comes under any resolution, but it is particularly denoted as R herein by way of explanation. Here, assume that the quantization table has a linear relationship with the frequency, i.e., a following Eq. (5) is satisfied.

$$NQ_{F(R)}=Q_{F(R)\times N} \tag{5}$$

Eq. (5) represents the quantization table shown in FIG. 5. Eq. (5) and Eq. (1) are substituted into Eq. (4).

$$NQ_{F(R)}=Q'_{F(R)\times N}=Q'_{F(R/N)} \tag{6}$$

That is, if the N-times quantizing steps in the quantization table Q at the certain resolution R are equal to the quantization table Q' at the resolution R/N, Eq. (4) can be satisfied. In short, it is possible to say that, when the resolution is reduced to 1/N, respective factors in the quantization table may be multiplied by 1/N. If this is written more schematically, a following Eq. (7) is given.

(Quantizing step)= (Reference quantizing step)/(Reference resolution)×(Resolution) (7)

Figure 6:
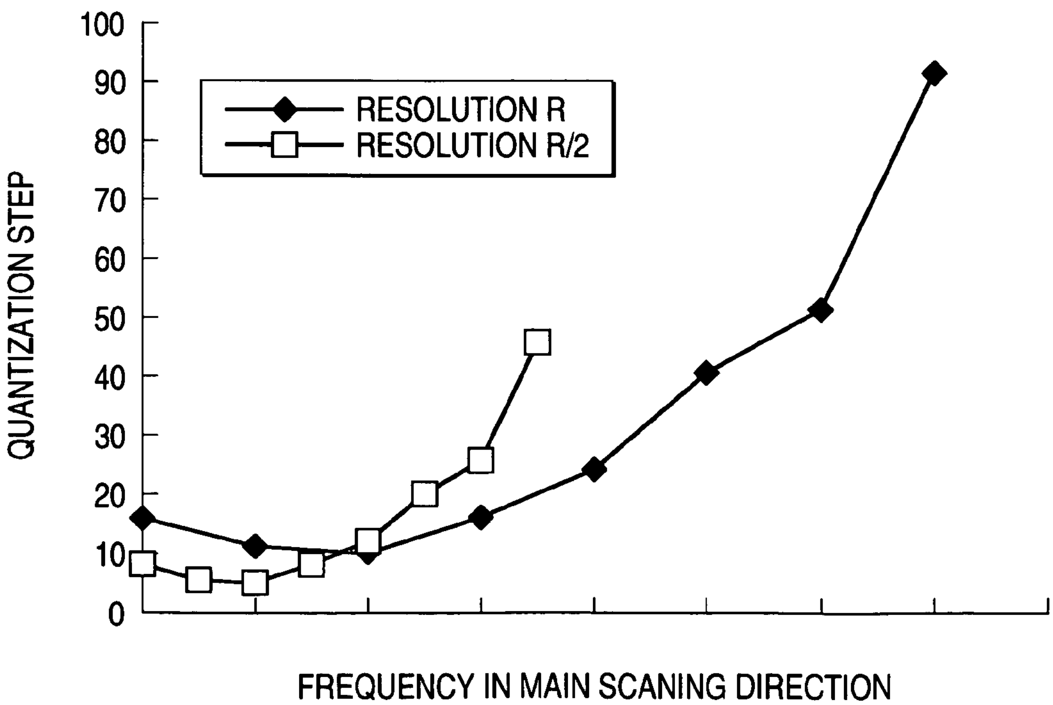
FIG. 6 is a view showing an example of the quantization table calculated by the image coding apparatus according to the first embodiment of the invention.

In this case, since normally the quantization table is not linear as shown in Eq. (5), it is impossible to apply the above discussion as it is. As an example, a relationship between the frequency and the quantizing step in the main scanning direction in the recommended quantization table of JPEG when the vertical scanning direction is DC is shown in FIG. 6. Also, the quantization table obtained from Eq. (7) when the resolution is set to ½ is shown in FIG. 6. Both quantization tables do not perfectly coincide with each other unlike the linear quantization table.

Figure 7:
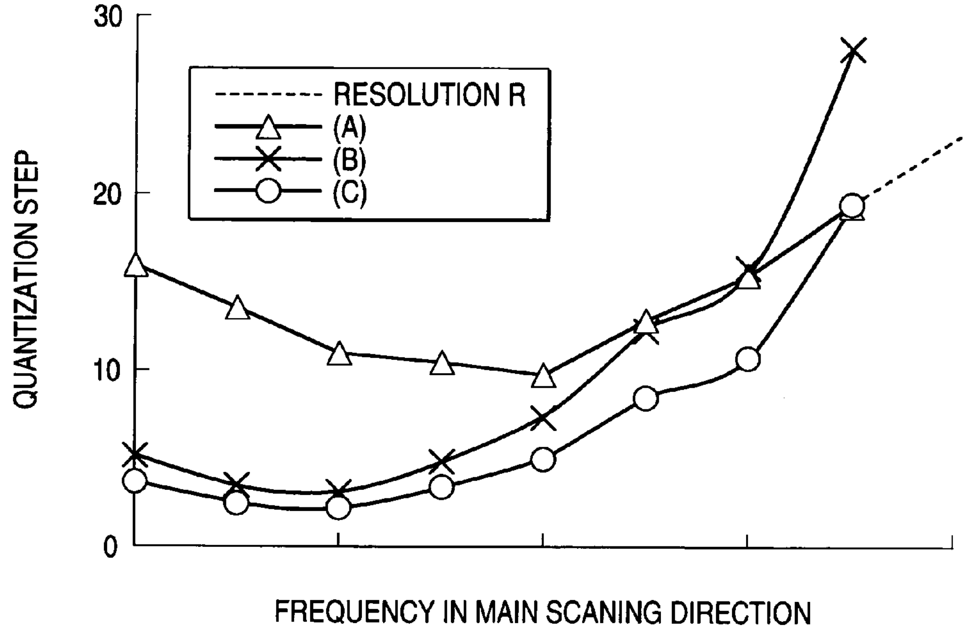
FIG. 7 is a view showing another example of the quantization table calculated by the image coding apparatus according to the first embodiment of the invention.

In such case, the quantizing step may be adjusted by employing another scale. FIG. 7 shows such example. The simplest way is to pick up and use the low frequency range of the original quantization table. In case the resolution should be reduced, any interpolation may be applied to pick up the values. (A) in FIG. 7 shows an example in which the quantizing step is pick up by using the linear interpolation. Also, in case the resolution should be increased, the extrapolation may be applied.

In case of JPEG, it is normal that the quantization table is calculated by multiplying the recommended quantization table by a constant. This constant is called a scaling factor. Since the example of (A) in FIG. 7 has a non-linear relationship with the original quantization table, such example cannot be expressed by the scaling factor. The quantization table that can be expressed by using the scaling factor will be considered hereunder.

First, differences between both quantizing steps are evaluated by using a certain scale, e.g., the sum of square errors, the sum of absolute values, the maximum values, etc. Then, the quantizing step can be decided to minimize the evaluation value. (B) in FIG. 7 shows an example in which the quantizing step is evaluated by sum of absolute value. Also, if the image quality is absolute, the quantizing step can be decided such that the quantizing step is not projected from the original quantizing step. The quantizing step of (C) in FIG. 7 is decided in such manner. Although all approaches are applied to the full frequency band herein, the similar approach may be applied mainly to the low frequency range in the image in which the high frequency range is not important, e.g., the smooth photograph with no edge, etc. Although the case where the resolution is reduced is explained with the above, the case where the resolution is increased may be considered similarly.

In addition, several adjustments of the quantizing steps will be explained from another viewpoint. When the resolution is lowered, the compression noise scattering area is widened. For example, since each of 8×8 blocks is compressed independently in JPEG, the noise emitted from each of blocks is stopped in each of blocks. At this time, when the resolution is lowered, the actual area that is occupied by one block is increased and thus the noise is prominent. A coefficient used to make the quantizing step small may be provided in the low resolution by taking such phenomenon into consideration.

It is difficult to calculate theoretically such coefficient, nevertheless the coefficient can be calculated easily by using the sensory evaluation. Since the sensory evaluation in this case corrects the relationship between the intensity and magnitude of the noise and the subjective image quality, there is no necessity unlike the sensory evaluation in the related art that has to vary many parameters. Thus, the sensory evaluation in this case can be carried out relatively easily.

Eq. (7) can be written into the more common form containing these adjustments as follows.

(Quantizing step)=*f*((Reference quantizing step), (Reference resolution),(resolution)) (8)

As explained above, according to the first embodiment, since the quantization table is calculated to apply the same quantizing step to the same frequency component, the change in the image quality due to the resolution can be improved. At this time, since the calculation of the quantization table can be carried out extremely simply, it is possible to overcome the problems such as the cost, the adaptability, etc. in the related art.

[Second Embodiment]

Figure 8:
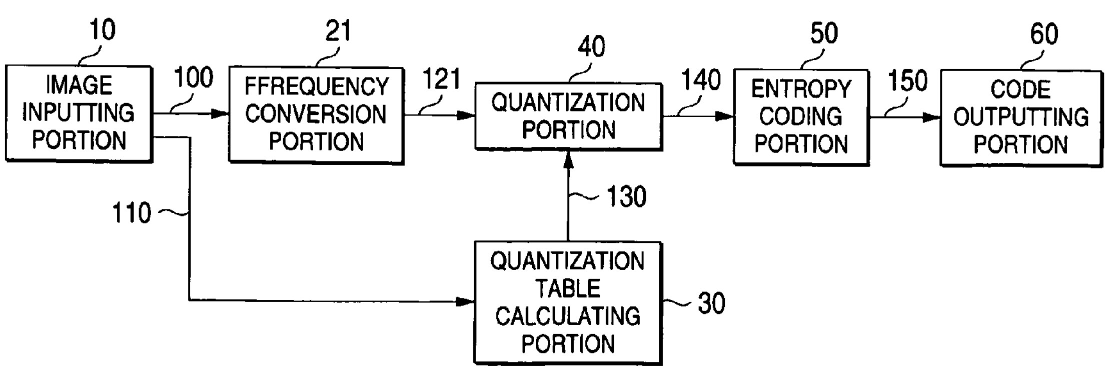
FIG. 8 is a view showing a configuration of an image coding apparatus according to a second embodiment of the invention.

As a second embodiment of the present invention, an example in which the first embodiment is applied to the more common frequency conversion coding will be explained. Detailed explanation of the second embodiment will be given hereunder. FIG. 8 is an image coding apparatus of the second embodiment. In FIG. 8, the same numerals are assigned to the portions similar to those in FIG. 1 and FIG. 11, and their explanation will be omitted. Reference numeral 21 is a frequency converting portion, and 121 is frequency component data.

In the second embodiment, as shown in FIG. 8, the frequency converting portion 21 applies the frequency conversion to the image data 100 by a predetermined approach, and then sends out the data to the quantizing portion 40 as the frequency component data 121. Since an operation of the second embodiment based on the above configuration is apparent from the explanation in the first embodiment, their explanation will be omitted.

The frequency conversion carried out by the frequency converting portion 21 in the above operation is any one of wavelet transform, discrete Hartley transform (DHT), Walsh-Hadamard transform (WHT), discrete Fourier transform (DFT), discrete sine transform (DST), Haar transform, slant transform, Karhunen-Loeve transform (KLT), lapped-over transform (LOT), etc.

Similarly, in the first embodiment, the entropy coding portion 50 is limited to the Huffman coding or the arithmetic coding in JPEG, but the more common entropy coding may be applied. For example, Lempel-Ziv (LZ) coding, Golomb-Rise coding, block sorting coding, Markov model coding, etc. correspond to this coding. Also, in the first embodiment, the quantizing portion 40 is limited to the certain type linear quantization in JPEG, but more common linear quantization and non-linear quantization may be applied.

As described above, according to the second embodiment, the present invention may be applied to the more common frequency conversion.

[Third Embodiment]

As a third embodiment of the present invention, an example in which the fine adjustment of the image quality is carried out will be explained. As has already been described, one of the problems in the related art is that, since the adjustment of the image quality is executed based on only stored results of the sensory evaluations, it is impossible to executed the fine adjustment of the image quality. In this case, it is evident that, as has already been examined by Eq. (7), the present invention can correspond to the unexpected incomplete resolution. Therefore, the embodiment in which the fine adjustment of the image quality is applied will be explained hereunder.

Figures 9, 10:
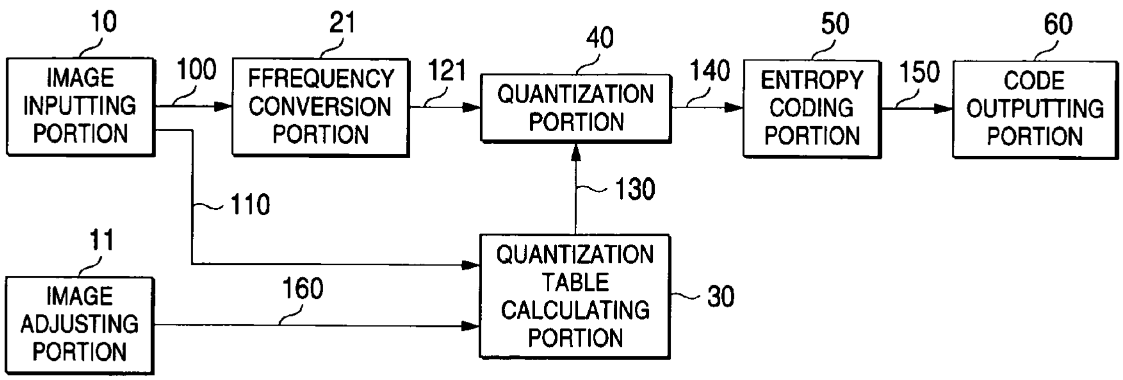
FIG. 9 is a view showing a configuration of an image coding apparatus according to a third embodiment of the invention.
FIG. 10 is a view showing an example of a table of image quality corrected values and corrected quantizing steps in the image coding apparatus according to the third embodiment of the invention.

There are various references of the image quality according to the user. For example, in the printer, the image quality offered by the designer is totally different from that requested by the normal office worker. In such case, it is preferable that the adjustment of the image quality should be performed simply. Detailed explanation of the third embodiment will be given hereunder. FIG. 9 shows an image coding apparatus according to the third embodiment. In FIG. 9, the same symbols are allotted to the portions similar to those in FIG. 1, FIG. 8, and FIG. 11, and their explanation will be omitted. Reference numeral 11 is an image quality adjusting portion, and 160 is image quality adjusted data.

In the third embodiment, as shown in FIG. 9, the image quality adjusting portion 11 receives the image quality adjusting parameters from the external device, and sends out the image quality adjusted data 160 to the quantization table calculating portion 30. Since an operation of the third embodiment based on the above configuration is apparent from the explanation of the first and second embodiments, their explanation will be omitted.

The execution of the adjustment of the image quality in the quantization table calculating portion 30 will be given.

Eq. (8) is employed in the quantization table calculating portion 30. This equation is rewritten as follows.

$$\text{(Quantizing step)}=f(\text{(Corrected quantizing step), (Reference resolution),(resolution)}) \quad (9)$$

$$\text{(Corrected quantizing step)}=g(\text{(Reference quantizing step), (Corrected value)}) \quad (10)$$

For example, the function g may be expressed by any equation or may be prepared as a table. In case that the table is prepared, the corrected quantizing step may be defined only as a function of the corrected value. The corrected value is not limited to numerical value. This is expressed by an equation as follows.

$$\text{(Corrected quantizing step)}=g(\text{(Corrected value)}) \quad (11)$$

FIG. 10 shows an example of Eq. (11).

There is no necessity that Eq. (10) should be calculated every time. For example, once the user sets the corrected value in response to the level of using environment, subsequent operation is similar to that designed in the second embodiment, while using the corrected value as the reference. Therefore, the further adjustment is not needed. It is of course that no problem occurs if the adjustment of the corrected value is tried frequently according to the occasional applications.

As described above, according to the third embodiment, the fine adjustment of the image quality can be accomplished and thus the convenience can be improved much more.

As apparent from the above explanation, according to the present invention, the change in the image quality due to the difference of the resolution can be improved in the lossy coding employing the frequency conversion.

What is claimed is:

1. An image coding apparatus comprising:
- an image inputting section that inputs an image;
- a frequency converting section that applies frequency conversion to the image;
- a quantization parameter calculating section that calculates a quantization parameter based on resolution of the image inputted by the image inputting section;
- a quantizing section that applies quantization to a frequency component of the converted frequency based on the quantization parameter;
- a coding section that codes an output of the quantizing section; and
- a code outputting section that outputs an output of the coding section as a code,
- wherein the quantization parameter calculating section calculates the quantization parameter for applying a predetermined quantization to the frequency component of the image in accordance with a function having a reference quantization parameter, reference resolution, and the resolution of the image inputted from the image inputting section as arguments.

2. The image coding apparatus according to claim 1, wherein the frequency conversion executed by the frequency converting section is DCT;
- the coding executed by the coding section is one of a Huffman coding and an arithmetic coding; and
- the code outputted from the code outputting section is based on a JPEG system.

3. The image coding apparatus according to claim 1, wherein the quantization parameter calculating section calculates the quantization parameter in accordance with an equation of (a reference quantization parameter)÷(the reference resolution)×(the resolution of the image inputted from the image inputting section).

4. The image coding apparatus according to claim 1, wherein the quantization parameter calculating section extracts a corresponding frequency component from an interpolated reference quantization parameter.

5. The image coding apparatus according to claim 1, wherein the quantization parameter calculating section multiplies a reference quantization parameter by a constant to calculate the quantization parameter; and the constant is determined to minimize one of a sum of square differences between the reference quantization parameter and the quantization parameter, a sum of absolute values of the differences between the reference quantization parameter and the quantization parameter, and a maximum of the differences between the reference quantization parameter and the quantization parameter.

6. The image coding apparatus according to claim 1, wherein the quantization parameter calculating section multiplies a reference quantization parameter by a constant to calculate the quantization parameter; and the constant is determined so that the quantization parameter is lower than the reference quantization parameter.

7. The image coding apparatus according to claim 1, wherein the quantization parameter calculating section calculates a difference between the quantization parameter and the reference quantization parameter at a limited range of frequency.

8. The image coding apparatus according to claim 1, wherein a corrected value is obtained by sensory evaluation; and when a resolution of the image inputted from the image input section is lower than the reference resolution, the quantization parameter calculating section compensates the quantization parameter by using the corrected value with taking into consideration a noise scattering range.

9. The image coding apparatus according to claim 1, further comprising an image quality adjusting section adapted to input a corrected value of the image quality, wherein the calculation in the quantization parameter calculating section is performed based on the corrected value.

10. The image coding apparatus according to claim 9, wherein the quantization parameter calculating section calculates a corrected quantization parameter according to a function of a reference quantization parameter and the corrected value, and calculates the quantization parameter according to another function having the corrected quantization parameter, the reference resolution, and a resolution of the image as arguments.

11. An image coding method comprising:

inputting an image;

applying frequency conversion to the image;

calculating a quantization parameter based on resolution of the image;

applying quantization to a frequency component of the converted frequency based on the quantization parameter; and coding the quantized frequency component, wherein the quantization parameter is calculated for applying a predetermined quantization to the frequency component of the image in accordance with a function having a reference quantization parameter, reference resolution, and the resolution of the image as arguments.

12. The image coding method according to claim 11, further comprising:

correcting the quantization parameter in response to designation from an outside.

13. A recording medium for recording computer-readably an image coding computer program executed in a computer, the program comprising:

inputting an image;

applying frequency conversion to the image;

calculating a quantization parameter based on resolution of the image;

applying quantization to a frequency component of the converted frequency based on the quantization parameter; and coding the quantized frequency component, wherein the quantization parameter is calculated for applying a predetermined quantization to the frequency component of the image in accordance with a function having a reference quantization parameter, reference resolution, and the resolution of the image as arguments.

* * * * *